July 20, 1965

G. S. BISHOP 3,195,838

CONTROL FAULT VETO

Filed Dec. 26, 1963

INVENTOR
GEOFFREY S. BISHOP
BY
ATTORNEYS

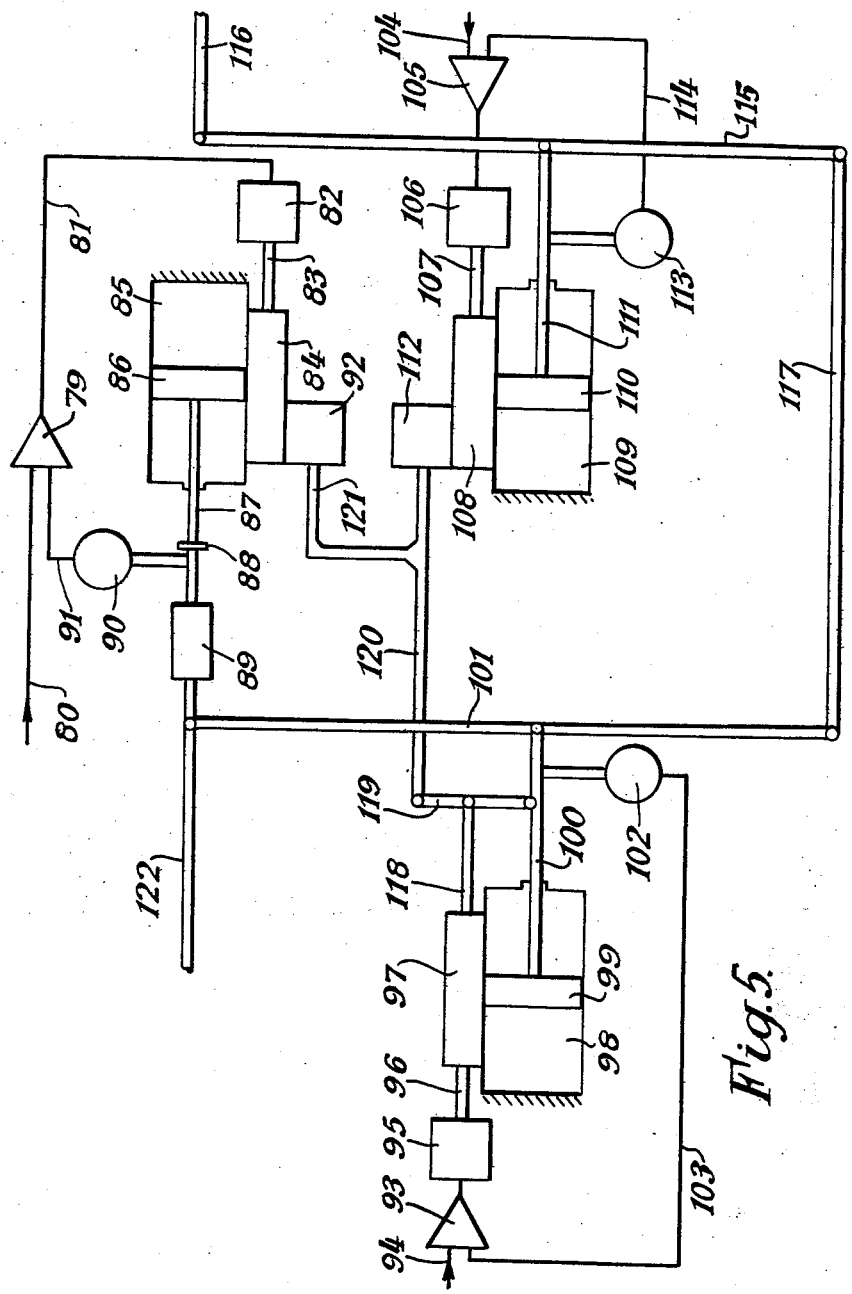

United States Patent Office 3,195,838
Patented July 20, 1965

3,195,838
CONTROL FAULT VETO
Geoffrey Stanley Bishop, Luton, England, assignor to Elliott Brothers (London) Limited, London, England, a British company
Filed Dec. 26, 1963, Ser. No. 333,528
Claims priority, application Great Britain, Jan. 4, 1963, 583/63
8 Claims. (Cl. 244—78)

This invention relates to an arrangement for the automatic control of aircraft which enables a high-powered control system, that is, a control system having unlimited authority, to be used with complete safety.

In VTOL aircraft employing a plurality of lift engines, possibly in wing pods, and in conjunction with other engines providing forward thrust, or providing a combination of thrust and lift, an engine failure or a drop in engine performance in one of the lift engines may result in sudden angular accelerations of the aircraft structure which render recovery by the human pilot almost impossible. It is therefore highly desirable to use an automatic control system which can, by suitable means, sense such a failure and correct for it immediately. In accordance with conventional thought an auto-stabilizer can be used to reduce the effects of such an engine failure but this method suffers from several drawbacks. One drawback is that the response speed required necessitates the use of an auto-stabilizer of extreme sensitivity, and this in turn makes it difficult to achieve stable operation of the auto-stabilizer system, particularly in the presence of structural flexibility in the aircraft, which is almost always present to a greater or lesser extent, since an auto-stabilizer having such a high degree of sensitivity will respond to structural flexure and take immediate counter measures. Furthermore to operate properly the auto-stabilizer system used in this manner must be given a very high degree of authority and this renders the system in itself dangerous in case of a runaway type of failure in the auto-stabilizer, since in such circumstances the failure will falsely produce an equivalent effect to an engine failure and the pilot will be in equal difficulty in dealing with it.

The basic conception underlying the invention is that a direct measurement is made of the thrust of each jet nozzle being used for lift or control, that is to say, engine nozzles and puffer nozzles where used, these thrusts are resolved into their components in a suitable system of axes, and the components are then combined to give the forces and moments acting on the aircraft, the analysis and re-combination of the components being carried out by a computing mechanism which is based on known practice. The forces and moments derived from this apparatus are then compared with the forces and moments commanded by the setting of the pilot's primary controls, for example, by measuring the position of, or the forces in, these controls, and the error signals, that is to say, the difference signals resulting from the comparison, are used to control conventional servo actuators connected to the aircraft primary control systems and acting in such a sense as to remove the errors by altering the forces and moments acting on the aircraft until they correspond with the forces and moments commanded by the position of the pilot's primary controls. Such a system will be called the force and moment control system.

The force and moment control system as described has the inherent ability to compensate for changes in engine performance including the extreme case of engine failure, the latter case being, of course, dependent upon there being sufficient reserve power in the other engines to compensate for the failure of the one. However, in order to carry out these actions the force and moment control system requires sufficient authority to produce an effect on the aircraft comparable with the effect of an engine failure in order to be able to counteract an engine failure. This introduces a serious safety problem in case of a failure in the force and moment control system which, as in the case of the auto-stabilizer system referred to above, would be able to produce an effect equivalent to an engine failure.

The safety problem postulated above in the case of the auto-stabilizer has, of course, existed in the past and it has usually been met by limiting the authority of the control system. In the present instant, however, this is not appropriate since it would cancel the very object which is being aimed at. Another known method of meeting this safety problem is by redundancy, that is, by duplicating the elements which are likely to fail, for example, by multiplexing, but this solution leads to an undesirable increase in the amount of equipment required and presents problems in failure detection. Accordingly the invention provides means for comparing the actions of the force and moment control system with the actions of a completely independent stabilizer system having limited authority and using one to veto the actions of the other.

The invention consists of a control arrangement for aircraft comprising means to derive a measure of a force and/or moment to be exerted on the aircraft structure as commanded by the setting of a pilot's primary control, a first device to measure the force and/or moment actually being exerted and to produce a signal dependent upon the difference, a first actuator responsive to the difference signal to act upon the aircraft primary control system, a second and independent device such as an auto-stabilizer to measure the attitude of the aircraft and to provide a signal corresponding to the departure of the attitude from a desired attitude, a second actuator associated with the second device to act upon the aircraft primary control system, and veto means associated with the two actuators whereby one device is able to veto the action of the other if the signals of the two devices are of opposite senses indicating that one of the devices has developed a fault.

In one preferred embodiment of the invention a force and moment control device having unlimited authority is used in conjunction with an auto-stabilizer with a safe limited authority, and the auto-stabilizer is given the means to veto the intended actions of the force and moment control when these tend to apply a control in the opposite sense to the auto-stabilizer. Where the auto-stabilizer is tending to position an actuator in accordance with an aircraft angular rate the position of this actuator may be used to apply a mechanical restraint which prevents or reduces any movement by the force and moment control actuator in an opposing sense. One simple method of carrying this into effect is to use any movement of the auto-stabilizer actuator outside a dead region representing the safe aircraft angular rate (say of the order of 5° per second) to control mechanically the valves in the hydraulic pressure lines supplying one or other side of the hydraulic control actuator associated with the force and moment control.

In another embodiment the same mechanical movement of the auto-stabilizer actuator may be used to re-centre the position demand input to the force and moment actuator thereby not only stopping the force and moment actuator where it is (if its movement is in the wrong sense) but actually returning it to its centre position and removing the effects of any runaway which may have taken place before the veto system could come into full operation.

These embodiments do not preclude the use of redundancy, that is, the duplicating or multiplexing of components or units either in the force and moment control or in the auto-stabilizer if such are regarded as desirable in order to provide still further increased safety measures. One possibility is to use a multiplex full authority auto-stabilizer to veto the action of an integrally redundant single force and moment control device. Furthermore, the methods described may be applied to control of an aircraft about one axis or to control the movements of the aircraft about any combination of axes, for example, to control roll, pitch and yaw, and also vertical displacement. Thus the invention basically contemplates the use of independent dissimilar systems and the comparison of the outputs of these systems in such a way that one can apply a veto to the action of the other where this action is a faulty one, the veto applying a positive restraint to the faulty action but not necessarily preventing the vetoed system from continuing in operation if the faulty action should only be transient. Such vetoing action may be applied by either system to the other, according to the selected arrangement.

The vetoing device, as described, comprises a mechanical linkage between two actuators but it will be understood that the veto action can also be achieved by electronic means if desired.

A further feature of the invention concerns the integration of auto-pilot inputs.

In the first embodiment hereinbefore described the auto-stabilizer actuator has its authority limited at a specified safe aircraft rate against runaways, and as this authority is adequate for any normal auto-pilot manoeuvres, the auto-pilot inputs can be applied to the force and moment actuator in parallel with the force and moment computer demands, so that no further safety precaution is required on the auto-pilot input.

In order to achieve a more rapid veto action it may be desirable, where the auto-stabilizer actuator employs position feedback for its operation, to use the servo input valve movement mechanically combined with the actuator output position to obtain the veto action in the case, described above, where the auto-stabilizer controls the veto action. By this means a measure of phase advance may be achieved, that is to say, the veto device will be actuated a little earlier in time.

It will be readily apparent to those well versed in the art that with different arrangements of actuators, it is possible to use terms other than angular rate and angular acceleration in the operation of the system according to the invention.

Furthermore, the auto-stabilizer system need not necessarily be restricted to accepting angular rate and acceleration especially as, for many applications, an element of attitude stabilization may be desirable. In such circumstances the veto action may well be based on a combination of aircraft attitude, aircraft angular rate and aircraft angular acceleration. In the case of vertical movement control, the veto action may be based on information relating to height above ground, rate of change of height and vertical acceleration.

One embodiment of the invention will now be described, by way of example, with reference to the drawings accompanying this specification, in which:

FIGURE 5 is a diagram showing a complete control arrangement according to the invention.

Figure 1:
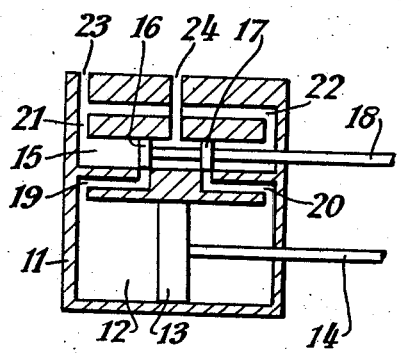
FIGURE 1 is a dagrammatic section of a conventional hydraulic actuator controlled by a conventional four-port valve.

Referring now to FIGURE 1, the hydraulic actuator shown therein comprises a casing 11 formed with a fluid pressure cylinder 12 containing a piston 13 connected to a piston rod or ram 14, which projects from one end of the cylinder 12, it being understood that an appropriate fluid pressure seal or gland is provided at the point at which the piston rod 14 emerges through the end of the casing 11. Lying parallel to the cylinder 12 is a valve cylinder 15 containing a spool valve having two cylindrical portions 16 and 17 connected by an operating rod 18 which passes through the side of the casing 11 there being again an appropriate fluid seal or gland. The spacing of the two cylindrical portions 16 and 17 is such that when the spool valve is in a central or neutral position the cylindrical portions 16 and 17 respectively close two passages 19 and 20 connected to the two ends of the cylinder 12. The two ends of the valve cylinder 15 are connected to the low pressure or exhaust side of the hydraulic system by two passages, respectively 21 and 22, which join together in a common low pressure outlet 23. A high pressure inlet 24 connects with a passage which opens into the central portion of the cylinder 15 between the two cylindrical portions 16 and 17 of the spool valve.

With the parts in the positions shown in FIGURE 1 the actuator is in a neutral position and the fluid pressure applied through the inlet 24 acts on the inner faces of the cylindrical portions 16 and 17 so that the forces exerted on the rod 18 are balanced. Similarly, the forces acting on the two faces of the piston 13 due to fluid pressure previously applied are balanced and the piston rod 14 is stationary. If the rod 18 is moved to the left in FIGURE 1 fluid under pressure is admitted through the passage 19 to the left-hand end of the cylinder 12, and at the same time the passage 20 is opened to the same extent to the passage 22 and thence to the low pressure outlet 23. In consequence the piston 13 and the piston rod 14 are moved to the right and they will continue to move until either the piston has reached the maximum limit of its stroke or until the rod 18 is moved back to its original position. If, on the other hand, the rod 18 is moved to the right in FIGURE 1 then fluid under pressure from the inlet 24 is admitted through the passage 20 to the right-hand end of the cylinder 12 while the left-hand end is connected through the passage 19 which is opened to exactly the same extent via the passage 21 to the low pressure outlet 23, and the reverse action takes place, that is to say, the piston 13 and piston rod 14 are moved to the left until either these members have moved to their maximum permitted extent or the rod 18 is returned to its initial position. This type of valve is known but a full description has been given so that the functioning of the novel actuator shown in FIGURE 2 may more readily be understood.

Figure 2:
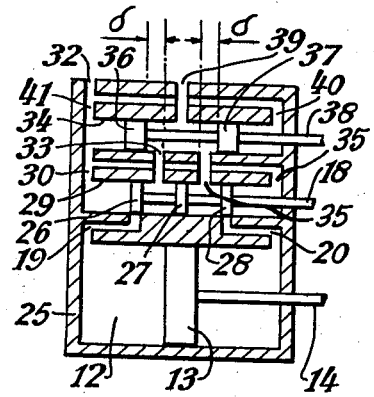
FIGURE 2 is a valve equivalent to that of FIGURE 1 but with a veto device incorporated.

In the actuator of FIGURE 2 the casing 25 is of somewhat different form but it contains a cylinder 12 identical with the cylinder 12 of FIGURE 1 and an identical piston 13 and piston rod or ram 14. The control valve connected to the rod 18 and operating in the valve cylinder 29 is somewhat different in that it is provided with three cylindrical portions, respectively 26, 27 and 28. The two cylindrical portions 26 and 28, when in the central position, cover the two passages 19 and 20 leading from the two ends of the cylinder 12. Both ends of the cylinder 29 are connected respectively through passages 30 and 31 to an exhaust or low pressure outlet passage which terminates in a low pressure outlet 32.

Between the cylindrical portions 26 and 27 is a passage 33 leading to a veto valve cylinder 34 and between the cylindrical portions 27 and 28 is still another passage 35, also leading to the cylinder 34. Both the passages 33 and 35 lead into the cylinder 34 between two cylindrical portions, respectively 36 and 37, of a veto valve control rod 38 extending through the casing. The centre of the cylinder 34 is provided with another passage 39 which is the high pressure inlet passage. The two ends of the cylinder 34 are connected respectively by passages 40 and 41 to the low pressure outlet passage 32.

With the parts in the positions shown in FIGURE 2, operation of the control valve by means of the rod 18 causes the actuator to function normally. For example, if the valve is moved to the left in FIGURE 2 then the cylindrical portion 26 uncovers the passage 19 which is connected through the passage 32 and the cylinder 34 to the high pressure inlet 39, and the same movement uncovers the passage 20 to the same extent and connects this passage to the low pressure exhaust outlet 32. On the other hand, movement of the spool valve to the right by means of the rod 18 causes the passage 20 to be uncovered and connected through the passage 35 and the cylinder 34 to the high pressure inlet 39 and at the same time causes the cylindrical portion 26 to uncover an equal amount of the passage 19 to connect the passage 19 to the low pressure outlet 32. If, by operation of the rod 38, the veto valve is moved to the right in FIGURE 2, to the appropriate extent, the passage 33 is closed and this alters the operation of the actuator. If, with the passage 33 closed, the control valve is moved to the left, the passage 19 is uncovered and is thus open to a part of the cylinder 29 and to the passage 33, since the latter passage is closed high pressure fluid cannot flow into the left-hand end of the cylinder 12, and although the movement of the control valve also causes the passage 20 to be opened and connected through the passage 31 to the low pressure outlet passage 32, no movement of the piston 13 takes place because the control exercised by means of the rod 18 has been vetoed by the movement of the veto valve by means of the rod 38. If, with the veto valve in the same position, i.e. with the passage 33 closed, the control valve is moved to the right by operation of the rod 18, high pressure fluid entering through the inlet passage 39 passes through the centre portion of the cylinder 34, through the passage 35, through a part of the cylinder 29 and through the passage 20 into the right-hand end of the cylinder 12, and fluid at low pressure is exhausted through the passage 19 and the left-hand end of the cylinder 29 and the passages 30 and 41 to the low pressure outlet 32. Thus movement of the control rod 38 of the veto valve to the right allows the piston 13 to move to the left under the control of the control valve, but prevents movement of the piston 13 to the right.

If, now, the control rod 38 is moved to the left, so that the passage 35 is closed, the opposite conditions prevail. Under these conditions movement of the control rod 18 of the control valve to the right produces no result, since high pressure fluid is unable to flow into the passage 39 to gain access to the passage 20. On the other hand, movement of the control rod 18 to the left allows the actuator to function normally. Thus, a control device coupled to the control rod 38 of the veto valve can either leave the actuator free to move in either direction as directed by the control rod 18, or it can veto the commands applied to the control rod 18 in one direction or the other.

In FIGURE 2, two dimensions marked "δ" will be observed. These represent the distance which the veto valve must move before the veto action is completed in one direction or the other. They will be referred to again at a later stage.

Figure 3:
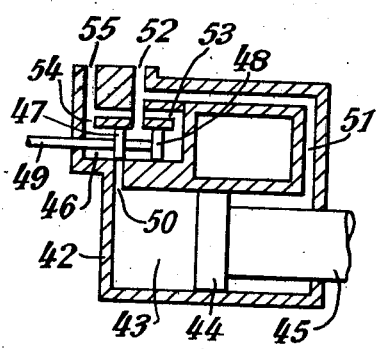
FIGURE 3 is a diagrammatic section of a conventional hydraulic actuator with a conventional three-port control valve of known type.

FIGURE 3 shows a conventional type of actuator having a three port control valve. It comprises a casing 42 containing a cylinder 43. A piston 44 has attached to it a piston rod 45 having a cross-sectional area of one half that of the piston 44. A control valve cylinder 46 contains a spool valve having two cylindrical portions 47 and 48 connected to each other and to a control rod 49 which extends outwardly through the casing 42. In the normal equilibrium position the cylindrical portion 47 covers a passage 50 which leads from the cylinder 46 to the end of the cylinder 43 opposite that through which the piston rod projects. The other end of the cylinder 43 is permanently conected by a passage 51 to a high pressure inlet passage 52. The cylindrical portion 48 of the control valve merely functions as a guide in the cylinder 46. The two ends of the cylinder 46 are connected respectively by passages 53 and 54 to a low pressure outlet passage 55.

The operation of this actuator is as follows. If the spool valve is moved to the left in FIGURE 3, by operation of the control rod 49, high pressure fluid flows through the inlet passage 52 and the passage 50 into the left-hand end of the cylinder 43. By virtue of the fact that the whole face of the piston 44 is acted upon by the high pressure fluid in the one direction whereas, due to the large piston rod, only one half the area of the piston is acted upon in the other direction the piston 44 moves to the right, expelling fluid through the passage 51 back to the high pressure inlet, and this movement continues until either the piston 44 has moved to its extreme limit or the control valve is moved back to its neutral position by means of the control rod 49. If, on the other hand, the control rod 49 is moved to the right, then the left-hand end of the cylinder 43 is connected through the passage 54 to the low pressure outlet 55 and high pressure fluid enters the right-hand end of the cylinder 43 through the inlet 52 and the passage 51. The piston 44 and the piston rod 45 accordingly move to the left until they have reached the end of their stroke or the control valve is closed again.

Figure 4:
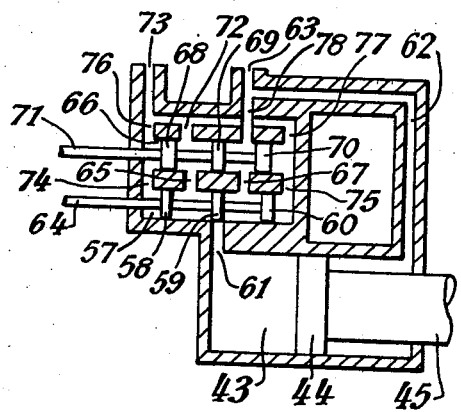
FIGURE 4 is a diagrammatic section of the valve of FIGURE 3 with the addition of a veto device.

FIGURE 4 shows a three port type of actuator with the addition of a veto valve according to the invention. The casing 56 contains the cylinder 43, the piston 44 and is attendant piston rod 45, as in FIGURE 3, but it contains two spool valves. The lower spool valve operating in cylinder 57, which is the control valve, has three cylindrical portions respectively 58, 59 and 60. When in the central or neutral position the cylindrical portion 59 covers a passage 61 leading from the closed end of the cylinder 43. The other end of the cylinder 43 is permanently connected through the passage 62 to a high pressure inlet passage 63. The control valve has a control rod 64.

Between the cylindrical portions 58 and 59 a passage 65 leads from the control valve cylinder 57 to a veto valve cylinder 66 and between the cylindrical portions 59 and 60 a further passage 67 also leads into the veto valve cylinder 66. The veto valve cylinder 66 contains a veto valve composed of three cylindrical portions, respectively 68, 69 and 70, joined together and connected to a control rod 71. The two portions of the cylinder 66 into which the passages 65 and 67 open are separated by the central cylindrical portion 69. Between the cylindrical portions 68 and 69 a further passage 72 leads from the cylinder 66 into a low pressure outlet passage 73. The two ends of the cylinder 57 are also connected by means of passages 74 and 75 to the low pressure outlet 73 and the two ends of the cylinder 66 are connected to the low pressure outlet 73 by respective passages 76 and 77. Between the cylindrical portions 69 and 70 a passage 78 leads from the cylinder 66 to a high pressure inlet 63.

In operation, with the veto valve in the position shown, the piston 44 and piston rod 45 may be moved in either direction under the control of the control rod 64, in the same way that the same parts are moved under the control of the control rod 49 in FIGURE 3. If, now, the control rod 71 is moved to the right in FIGURE 4 until the cylindrical portion 68 covers the passage 65, then movement of the control rod 64 to the right to allow the cylindrical portion 59 to open the passage 61 into the cylinder 43 has no effect, since the fluid in the left hand end of the cylinder 43 cannot escape into the low pressure outlet 73. On the other hand, movement of the control rod 64 to the left in FIGURE 4 will cause the piston 44 and piston rod 45 to move to the right since there is a connection from the inlet 63 through the cylinder 66, the passage 67 and the passage 61 into the left-hand end of the cylinder 43. If, on the other hand, the veto valve control rod 71 is moved to the left until the cylindrical portion 70 covers the passage 67 then movement of the control rod 64 to the right allows high pressure fluid to flow from the inlet 63 through the passage 62 and into the right-hand end of the cylinder 43, because low pressure fluid is allowed to escape through the passage 61 and the passages 65 and 72 into the low pressure outlet 73. Movement of the control rod 64 to the left, however, produces no effect, since high pressure fluid cannot pass from the passage 78 through the passage 67 and into the left hand end of the cylinder 43.

FIGURE 5 shows a complete control fault veto arrangement diagrammatically, employing actuators of the type shown in FIGURE 2 or FIGURE 4.

Referring to FIGURE 5, a control rod 122 is connected to a primary control of the pilot and its position represents the setting of the control and therefore a particular force and/or moment to be applied to the aircraft structure. The force or moment may be a thrust or may represent an attitude, or any other factor which has to be controlled during flight.

An amplifier 79 receives an input signal on the line 80 from an auto-pilot and provides an amplified control signal over the line 81 to an electromechanical transducer 82, such as a torque motor. The mechanical output of the transducer 82 is coupled to a shaft 83 which is the control rod of the control valve of one of the actuators shown in FIGURE 2 or FIGURE 4. Thus the control rod 83 may be the rod 18 in FIGURE 2 or the rod 64 of FIGURE 4, the control valve and its cylinder being represented by the box 84. The control valve 84 controls the supply of pressure fluid to the cylinder 85 and causes the piston 86 to move in accordance with the pressure applied. The high and low pressure fluid lines are not shown in FIGURE 5, to avoid complicating the diagram.

The movement of the piston rod 87, associated with the piston 86, is communicated through a clutch 88 and a spring box 89 to the control rod 122. The clutch 88 is for the purpose of disengaging the auto-pilot when it is not required, and the spring box 89 is of conventional type, to prevent the auto-pilot from applying more than a predetermined force to the control rod 122. A position pick-off device 90, responsive to the position of the rods coupled to the piston rod 87, delivers a feedback signal over a line 91 to the input of the amplifier 79, in accordance with normal servo practice, to ensure that when the piston rod 87 has moved by a required amount in response to a change in control signal on the line 80 the signal from the device 90 equals and cancels out the changed signal on the line 80. A veto valve 92 is associated with the control valve 84 and corresponds to the upper spool valve or veto valve shown in FIGURE 2 or FIGURE 4, controlled respectively by the control rods 38 and 71. Its function will be referred to in more detail later.

An amplifier 93 receives an input signal on a line 94 from a conventional auto-stabilizer. The amplifier 93 delivers a signal to a further electromechanical transducer 95 and the mechanical output of the latter is connected by a rod 96 to the control valve 97 of a further fluid pressure actuator having a cylinder 98, a piston 99 and a piston rod 100. The actuator comprising the parts 97 to 100 is not provided with a veto valve and is a conventional actuator of the type shown in FIGURE 1 or FIGURE 3. The piston rod 100 is pivotally linked to the centre point of a bar 101, one end of which is pivotally coupled to the rod 122 and a rod connected to the spring box 89. The piston rod 100 is also connected to a further position pick-off device 102 to supply an electrical feedback signal over the line 103 to the input of the amplifier 93, in accordance with conventional servo practice.

A force and moment computer (not shown) operating on the lines described in the opening part of this specification, may make use of conventional methods for measuring forces and/or moments acting on the aircraft structure, analyzing these in accordance with a predetermined system of axes and then recombining the forces and moments to provide force and/or moment signals according to the said system of axes. It provides a signal on line 104 corresponding to the particular force and/or moment which has been set up by the control rod 122. Thus, while the position of the control rod 122 represents the force and/or moment required, the signal on the line 104 represents the force and/or moment actually being applied. This signal is applied to another amplifier 105, which applies an output signal to another electromechanical transducer 106 having its mechanical output coupled by a rod 107 to the control valve represented by the box 108 of a further fluid pressure actuator comprising a cylinder 109, a piston 110 and a piston rod 111. The actuator comprising the elements 108 to 111 is also provided with a veto valve 112 so that the actuator corresponds to one of the types shown in FIGURE 2 or FIGURE 4. Another position pick-off 113 has its mechanical input coupled to the piston rod 111 and supplies a feedback signal over the line 114 to the input of the amplifier 105. The piston rod 111 is also coupled to the centre point of a bar 115 which has its one end pivotally connected to a control rod 116 and has its other end pivotally connected to one end of a rod 117, the latter having its other end pivotally connected to the free end of the bar 101. The control rod 116 is coupled to one or more of the primary controls on the aircraft which control the particular force and/or moment applied to the aircraft structure commanded by the piston of the control rod 122.

In operation, the particular force and/or moment which is being controlled is commanded by the position of the control rod 122, either established by the setting of the pilot's control or by the auto-pilot. The auto-stabilizer independently decides that correcting action is required to correct the attitude of the aircraft at any given moment and actuates its piston rod 100 accordingly. Assuming that the piston rod 111 is stationary, any movement of the piston rod 100 causes the bar 101 to be swung about the pivot connected to the rod 122, so that the bar 115 is pivoted about its centre point (connected to the piston rod 111) and the control rod 116 is moved accordingly. Any movement of the control rod 122, caused either by an action of the pilot or an automatic movement of the auto-pilot, is also transmitted through the system of bars and rods to the control rod 116.

The auto-stabilizer is given a limited authority. For example, it may be arranged that it can apply control signals through the piston rod 100 to cause an angular movement of the aircraft structure at a rate of not more than 5° per second. The actuator connected to the force and moment computer, on the other hand, is given unlimited authority and is therefore in a position to command movements at the high rates required in an emergency, such as the failure of a lift engine if the system is provided for the control of lift thrust.

When the auto-stabilizer applies a signal to its amplifier 93 the movement of the rod 96 connected to the electromechanical transducer produces an equal movement of the rod 118 and this is transmitted to a bar 119 having one end connected to the piston rod 100. Movement of the bar 119 causes movement of a rod 120 which is connected directly to the veto valve 112 and through a rigid angled bar 121 to the veto valve 92.

It will be remembered, from the description given of FIGURES 2 and 4, that if the veto valve is moved in one direction from its neutral position it will allow normal operation of the associated actuator in one direction but it will prevent movement of the actuator in the other direction. The veto valves are so arranged that if the auto-pilot or the force and moment computer applies a correction through its respective control valve 84 or 103 which is in accordance with the findings (i.e the movement) of the auto-stabilizer, then its action is not interfered with, but if either of these units should apply a signal in a sense which is contrary to the signal being applied by the auto-stabilizer then the respective veto valve is in the position in which it vetoes the movement which the auto-pilot or the force and moment computer is attempting to apply.

It may be desirable to arrange that the veto does not come into operation unless the force and moment computer (or the auto-pilot) attempts to apply a signal which is in excess of a normal safe maximum. For example, if the arrangement is designed to control the attitude of the aircraft and it is decided that a safe rate of change of angular position is 5° per second then the veto valve may be so arranged that the veto is not applied unless the auto-stabilizer detects a condition which requires a correcting action at a rate in excess of the predetermined rate of 5° per second. This is achieved by suitable choice of the dimensions marked "δ" in FIGURE 2. Similar considerations obviously apply to the actuator shown in FIGURE 4.

From the foregoing it will be clear that the arrangement according to the invention may be so adjusted that the veto action is only applied if two conditions are fulfilled (1) that the force and moments computer is attempting to apply a signal which is in excess of a predetermined safe maximum, i.e. that it is attempting to take emergency action, using its unlimited authority, and (2) that it is attempting to take emergency action in the wrong direction because it has developed a fault.

While one embodiment of the invention has been described as an example of the practical application of the invention, it is possible to devise other embodiments, or modifications within the scope of the invention as defined in the appened claims.

I claim:

1. A control arrangement for aircraft comprising means to derive a measure of a force and moment to be exerted on the aircraft structure as commanded by the setting of a pilot's primary control, a first device to measure the force and moment actually being exerted and to produce a signal dependent upon the difference, a first actuator responsive to the difference signal to act upon the aircraft primary control system, a second and independent device to measure the attitude of the aircraft and to provide a signal corresponding to the departure of the attitude from a desired attitude, a second actuator associated with the second device to act upon the aircraft primary control system, and veto means associated with the two actuators whereby one device is able to veto the action of the other if the signals of the two devices are of opposite senses indicating that one of the devices has developed a fault.

2. An arrangement as claimed in claim 1 in which said first device has unlimited authority while said second device has a safe limited authority, said second device having the means to veto the intended actions of the said first device if said first device produces a signal of opposite sense to that of said second device.

3. An arrangement as claimed in claim 1 in which said second device is an auto-stabilizer.

4. An arrangement as claimed in claim 2 in which said first actuator is a hydraulic actuator, said veto means enabling the supply of pressure fluid to the hydraulic actuator to be cut off, said veto means being controlled by said second actuator.

5. An arrangement as claimed in claim 4 in which said second actuator is a hydraulic actuator.

6. An arrangement as claimed in claim 4 in which said actuator comprises a double-acting piston and cylinder, a control valve in a ported valve bore, the control valve having two cylindrical end portions and a stem therebetween to control the passage of hydraulic fluid into and out of the two ends of the cylinder, a third cylindrical portion between the said two cylindrical end portions, a veto valve in a veto valve bore, the veto valve having two cylindical portions separated by a stem, two passages leading from the veto valve bore at points between the cylindrical veto valve portions into the control valve bore at points respectively between the cylindrical end portions and the central cylindrical portion of the control valve, and a high pressure fluid supply duct leading into the veto valve bore between the cylindrical portions of the veto valve, whereby the movement of the veto valve in one direction to close one of the passages prevents the supply of fluid to the cylinder in response to a movement of the control valve in the opposite direction, the two valve movements representing commands in opposite senses.

7. An arrangement as claimed in claim 4 in which said actuator comprises an actuator piston in a double-acting cylinder, a piston rod having substantially one-half the cross-sectional area of said piston passing through one end of said cylinder, a high pressure fluid supply duct, a permanent connection between said fluid supply duct and the said one end of said cylinder, a control valve in a control valve bore, said control valve having cylindrical portions separated by stem portions, the central cylindrical portion normally closing a port leading to the other end of said cylinder, a veto valve in a veto valve bore, said veto valve having three cylindrical portions separated by stem portions, passages leading from points in said veto valve bore between said cylindrical end portions and said central cylindrical portion of said veto valve into the corresponding points in said control valve bore between said cylindrical end portions and said central cylindrical portion of said control valve, a further duct leading from said high pressure fluid supply duct to said veto valve bore at a point between one cylindrical end portion and said central cylindrical portion of said veto valve, another duct leading from said veto valve bore at a point between the other cylindrical end portion and said central cylindrical portion of said veto valve to a low pressure exhaust passage, whereby movement of said veto valve in on direction to close one of said passages prevents the supply of fluid to said cylinder in response to a movement of said control valve in the same direction, the two valve movements representing commands in opposite senses.

8. An arrangement as claimed in claim 7 in which the separation of said cylindrical end portions of said veto valve is greater than the separation between said passages, whereby said veto valve is permitted a certain movement in either direction from its normal position before it begins to close a passage.

References Cited by the Examiner

UNITED STATES PATENTS 3,081,968  3/63  Pesola _____ 244—77

OTHER REFERENCES

Flight, pages 569–574, October 7, 1960, vol. 78, Reliability in Automatic Landing.

FERGUS S. MIDDLETON, *Primary Examiner.*

MILTON BUCHLER, *Examiner.*